United States Patent
Herger et al.

(10) Patent No.: US 9,135,849 B2
(45) Date of Patent: Sep. 15, 2015

(54) VARIABLE OPERATING MODE HMD APPLICATION MANAGEMENT BASED UPON CROWD DETERMINED DISTRACTION

(71) Applicant: International Business Machines Corporation, Armonk, NY (US)

(72) Inventors: Lorraine Herger, Port Chester, NY (US); Neal Keller, Pleasantville, NY (US); James R. Kozloski, New Fairfield, CT (US); Matthew A. McCarthy, Holly Springs, NC (US); Clifford A. Pickover, Westchester, NY (US); Drew Wyskida, Fishkill, NY (US)

(73) Assignee: International Business Machines Corporation, Armonk, NY (US)

( * ) Notice: Subject to any disclaimer, the term of this patent is extended or adjusted under 35 U.S.C. 154(b) by 42 days.

(21) Appl. No.: 14/169,617

(22) Filed: Jan. 31, 2014

(65) Prior Publication Data

US 2015/0221247 A1    Aug. 6, 2015

(51) Int. Cl.
*G02B 27/01*    (2006.01)
*G09G 3/20*     (2006.01)

(52) U.S. Cl.
CPC ............... *G09G 3/20* (2013.01); *G02B 27/017* (2013.01); *G09G 2320/06* (2013.01); *G09G 2380/10* (2013.01)

(58) Field of Classification Search
CPC . G09G 3/20; G09G 2320/06; G09G 2380/10; G09G 2354/00; G02B 27/017; G02B 27/0172; G02B 27/0178; G06F 3/048; G06F 3/04815

USPC .................................. 345/7, 8, 633; 359/630
See application file for complete search history.

(56) References Cited

U.S. PATENT DOCUMENTS 5,281,957 A    1/1994  Schoolman
5,949,345 A    9/1999  Beckert et al.
(Continued)

FOREIGN PATENT DOCUMENTS

WO          9854021          12/1998
WO        2011033365          3/2011

OTHER PUBLICATIONS

Burns, P, C., et al., "E-Distraction: The Challenges for Safe and Usable Internet Services in Vehicles," Internet forum on the safety impact of Driver Distraction when using in-Vehicle technologies. 2000, pp. 1-10.
(Continued)

*Primary Examiner* — Tom Sheng
(74) *Attorney, Agent, or Firm* — Fleit Gibbons Gutman Bongini & Bianco PL; Jon A. Gibbons

(57) ABSTRACT

Disclosed is a system and method for managing variable operating mode applications that vary a cognitive load of the output of the applications presented to users wearing head mounted display devices. A tolerance level is indicative of the cognitive load of each operating mode of an application is established. In a vehicle setting, the operating mode of the application is selected to enable the safe operation of the vehicle based in part upon the tolerance level associated with the operating mode. If errant operations of vehicles are detected, then an application server modifies the tolerance level and synchronizes the modified tolerance level with head mounted display devices including the application.

20 Claims, 3 Drawing Sheets

(56) References Cited

U.S. PATENT DOCUMENTS

| | | | |
|---|---|---|---|
| 6,181,996 | B1 | 1/2001 | Chou et al. |
| 6,466,232 | B1 | 10/2002 | Newell et al. |
| 6,974,414 | B2 | 12/2005 | Victor |
| 7,073,129 | B1 | 7/2006 | Robarts et al. |
| 7,924,506 | B2* | 4/2011 | Rieger ............ 359/630 |
| 8,368,794 | B2* | 2/2013 | Sako et al. ........ 348/333.01 |
| 2002/0044152 | A1* | 4/2002 | Abbott et al. ........ 345/629 |
| 2010/0087137 | A1 | 4/2010 | Fischer et al. |
| 2012/0081564 | A1 | 4/2012 | Kamiya |
| 2012/0224060 | A1 | 9/2012 | Gurevich et al. |
| 2013/0336629 | A1* | 12/2013 | Mulholland et al. ....... 386/230 |
| 2014/0049451 | A1* | 2/2014 | Sugiyama et al. ........ 345/8 |
| 2014/0071163 | A1* | 3/2014 | Kinnebrew et al. ........ 345/633 |

OTHER PUBLICATIONS

Salvucci, D, D., "Predicting the effects of in-car interface use on driver performance: an integrated model approach," International Journal of human-computer studies, Jul. 2001, pp. 85-107, vol. 55, Issue 1. doi:10.1006/ijhc.2001.0472. Copyright 2001 Academic Press, 1071-5819/01/010085.

Pompei, F., "An Automobile-Integrated System for Assessing and Reacting to Driver Cognitive Load," Convergence International Congress and Exposition on Transportation Electronics, Oct. 21, 2002, pp. 1-6. Copyright 2002 Society of Automotive Engineers, Inc.

* cited by examiner under appropriate conditions for a suitably defined algorithm to produce the claimed utility.

VARIABLE OPERATING MODE HMD APPLICATION MANAGEMENT BASED UPON CROWD DETERMINED DISTRACTION

BACKGROUND

The present description generally relates to the management of an output of information of an application operating on a Head Mounted Display system (HMD) based upon a crowd determined distraction level.

Advanced HMDs, including displays that resemble glasses, are becoming more popular. While HMDs hold the potential advantage of enhancing the driving experience, those concerned with safe vehicle operation consider the value of banning the wearing of such devices while a user is driving a vehicle because of the potential for driver distraction and resulting consequences. Operating a vehicle requires certain cognitive load and monitoring the output of an application requires a certain cognitive load. If the cognitive load of the application is too great, unsafe vehicle operation may result. However, a total ban on the use of HMDs in a vehicle may waste any potential advantages of HMDs.

SUMMARY

Disclosed is a method and apparatus for creating a safer environment for users of HMDs in a moving vehicle. An application server monitors the distraction level of users engaged in an activity, such as operating a vehicle while wearing HMDs that are operating variable output applications. If the distraction level is unacceptable then a tolerance level of the application output is adjusted for all HMDs. The HMD comprises a safety-checking module (SCM) that checks one or more real-time attributes of the HMD, vehicle, and/or driver, and an action-taking component (ATC) that takes a safety action, such as selecting a mode of the application, based on the SCM and the tolerance level of an application operating mode. Safety actions include reducing distraction level and/or cognitive load of content conveyed to user of HMD and/or changing car attributes such as reducing radio volume.

The disclosed subject matter makes use of HMD applications (Apps) with several modes associated with levels of distraction for a driver of a vehicle. An App store is involved with the delivery of such Apps to the HMD, and maintains and delivers the Apps, in a useful way, to the driver who uses an HMD. An automatic determination is made of user tolerance (T) for the levels (by crowdsourcing such as by learning through time via vehicle information such as drifting off road, lane departures, sudden braking or other erroneous operations). A selection of the application mode is made based on T. A determination is made of a role associated with an HMD user in a car (e.g. driver vs. passenger). Based on App mode and user role, an automatic determination is made with respect to presentation for a multimodal HMD (e.g. HMD video mode, or HMD audio mode, or sending information to car audio). Benefits are potentially realized by the "up-front" milieu associated with the service (e.g. App store) that provides Apps for use on HMDs in cars. The App store maintains various information for future use and for association with various Apps and users, where the levels of distraction and associated App modes asserted by different App developers for their apps are regularized by the service or store based on user feedback, measures from the vehicle, or crowdsourcing. The mode selection may be performed in real time or may be determined by the App store prior to a particular use context by a particular user.

In one example, a method comprises: at an application server, receiving a distraction signal based upon a user engaged in an activity while wearing a remote head mounted display system presenting an output of an application having a plurality of operating modes for modifying an amount of information presented to the user wearing the remote head mounted display system, each of the plurality of operating modes having a corresponding tolerance level for enabling the remote head mounted display system to select one of the plurality of operating modes, the distraction signal including a level of distraction of the user wearing the remote head mounted display system during the activity and the operating mode of the application; adjusting the tolerance level of at least one of the plurality of operating modes based upon the distraction signal; and enabling a second remote head mounted display system to operate the application based upon the adjusted tolerance level.

In another example an application server comprises a distraction analyzer operating a process adapted to: receive a distraction signal based upon a user engaged in an activity while wearing a remote head mounted display system presenting an output of an application having a plurality of operating modes for modifying an amount of information presented to the user wearing the remote head mounted display system, each of the plurality of operating modes having a corresponding tolerance level for enabling the remote head mounted display system to select one of the plurality of operating modes, the distraction signal including a level of distraction of the user wearing the remote head mounted display system during the activity and the operating mode of the application, and adjust the tolerance level of at least one of the plurality of operating modes based upon the distraction signal; and a synchronizer operating a process adapted to communicate the adjusted tolerance level to a second remote head mounted display system.

In another example, a computer program product comprises: a storage medium readable by a processing circuit and storing instructions for execution by the processing circuit of an application server for performing a method comprising: receiving a distraction signal based upon a user engaged in an activity while wearing a remote head mounted display system presenting an output of an application having a plurality of operating modes for modifying an amount of information presented to the user wearing the remote head mounted display system, each of the plurality of operating modes having corresponding tolerance level for enabling the remote head mounted display system to select one of the plurality of operating modes, the distraction signal including a level of distraction of the user wearing the remote head mounted display system during the activity and the operating mode of the application; adjusting the tolerance level of at least one of the plurality of operating modes based upon the distraction signal; and enabling a second remote head mounted display system to operate the application based upon the adjusted tolerance level.

BRIEF DESCRIPTION OF THE SEVERAL VIEWS OF THE DRAWINGS

The accompanying figures wherein reference numerals refer to identical or functionally similar elements throughout the separate views, and which together with the detailed description below are incorporated in and form part of the specification, serve to further illustrate various embodiments and to explain various principles and advantages all in accordance with the present description, in which.

DETAILED DESCRIPTION

Figure 1:
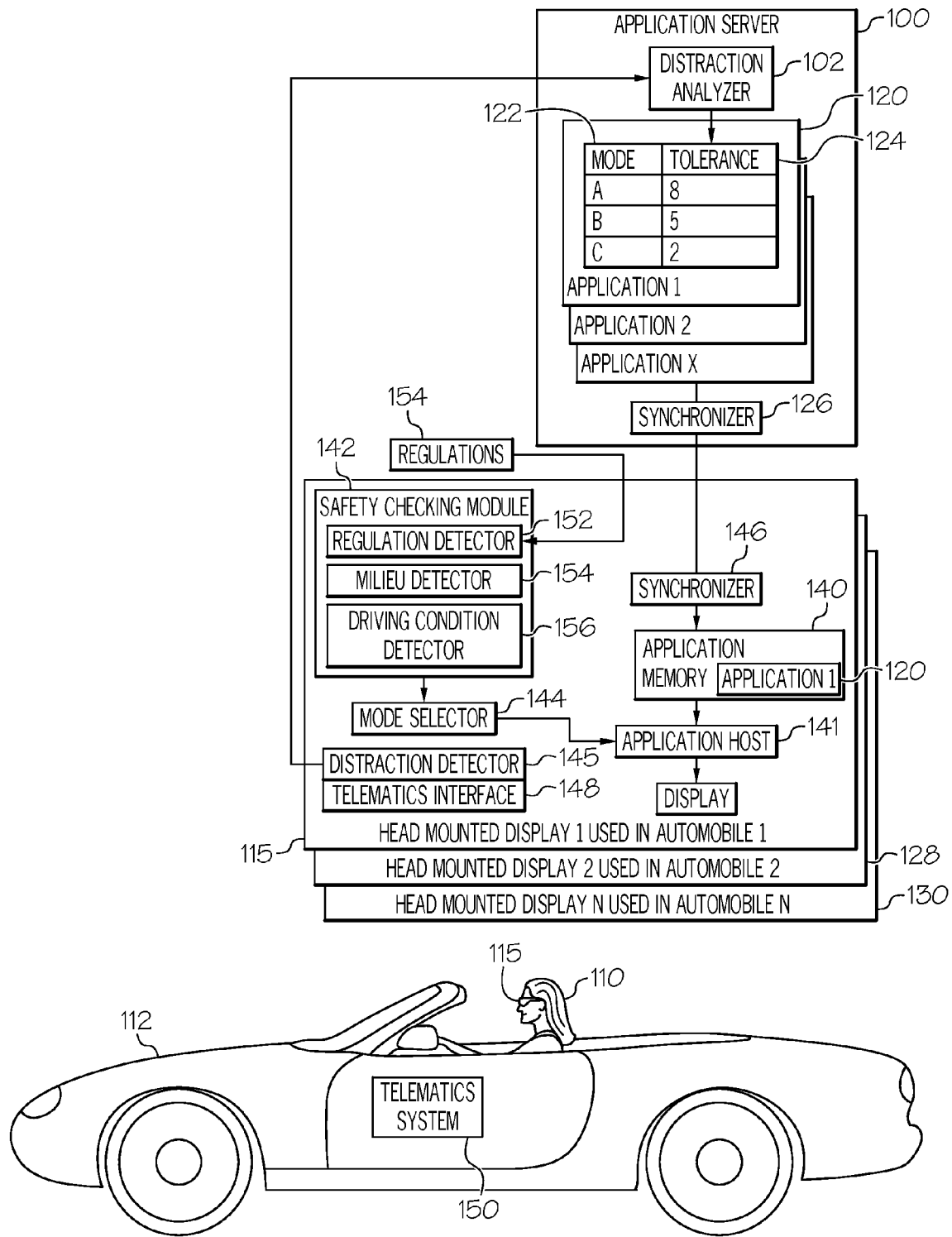
FIG. 1 illustrates an example block diagram of system for managing applications having a variable operating mode for use with a remote head mounted system.

As required, detailed embodiments are disclosed herein; however, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the present subject matter in virtually any appropriately detailed structure and function. Further, the terms and phrases used herein are not intended to be limiting, but rather, to provide an understandable description of the concepts.

The description of the present disclosure has been presented for purposes of illustration and description, but is not intended to be exhaustive or limited in the form disclosed. Many modifications and variations will be apparent to those of ordinary skill in the art without departing from the scope of the description. The embodiment was chosen and described in order to best explain the principles of the description and the practical application, and to enable others of ordinary skill in the art to understand the description for various embodiments with various modifications as are suited to the particular use contemplated.

HMDs come in many forms and form factors, and the scope of this description is intended to cover a range of such wearable devices that may include one or two small displays with lenses, with semi-transparent mirrors embedded in a helmet, eye-glasses, visors, CRTs, LCDs, liquid-crystal on silicon (LCos), OLED, "curved Mirror" HMDs, and "waveguide" HMDs. Furthermore, other forms and form factors are possible, such as displays embedded in contact lenses. The SCM (safety-checking module) may check any of the following: a detection that the HMD is on the face of the driver (e.g. a signal sent from glasses, a camera viewing the driver, etc.), the nature and content of the information being conveyed to the user (e.g. driving directions, weather maps, etc.), maximum allowable cognitive load for the state in which the vehicle is currently being operated (e.g., state as determined by GPS in vehicle or driver's smartphone), information relating to the car (e.g. car speed, road conditions based on traction control, use of brakes), or information relating to the driver (e.g. history of driving). The system may also detect the need for taking a turn or exit in the next N seconds.

The HMD may also recognize a set of eye and facial gestures of the driver to determine the alert level of the driver. For example, the gesture scanner may detect simple gestures such as yawning, eye closure or movements, etc. Methods for gesture detection and eye tracking are known in the enabling art, and if such gestures are detected by the HMD system, the ATC (action-taking component) may take actions (as described below to increase the probability of driver and pedestrian safety). Different information conveyed on the HMD (and different renderings of information on the HMD) will present varying levels of distraction to a driver. For example, simply showing the temperature outside the car has a low level of distraction. On the other hand, showing the driver a complex animated weather map, along with the avatar of a talking weather-person, provides a higher level of distraction. The ATC (action-taking component) may take various actions to increase the probability of providing a safer driving experiences. For example, the ATC may reduce distraction level and/or cognitive load of content conveyed to user of HMD by simply showing the outside temperature rather than an animated avatar presenting a weather map.

Application providers may create different output modes for conveying information so that a less-distracting rendition is presented when the need for less distraction is automatically detected. These different output modes may include alterations to the operating system (OS) of the device itself. For example a "HMD DRiver OS" may be provisioned by the ATC when the user is driving, whereas a "HMD Full OS" is provisioned by the ATC when the user is not driving. The provisioning of different OS versions may be automatic, as described above.

In another scenario, such as when driving in risky conditions, the ATC may simply disable the HMD. Disabling a HMD that incorporates prescription lenses while driving may be a statutory requirement if the HMD and the corrective lenses are inseparable. A user may realize the benefit of corrective lenses and the HMD during their daily activities, while only benefiting from the corrective lenses while driving.

The ATC may trigger the taking of a vehicle safety action (e.g. reduces volume of radio, at the permission of the user, based on a user profile or other kind of profile that allows such an option. The ATC may also send a signal to perform a real-time change to insurance fees or insurance level.

The real-time distraction level and/or cognitive load provided by the HMD may be estimated by any of: creator of software (e.g. software that displays information), crowd-sourcing of users (e.g. votes) relating to said software, a real-time estimate of said load (e.g. car system notices the driver is driving erratically or the deterioration of road conditions), analytics based on previous distraction level and/or cognitive load for similar drivers, information displays and road conditions, etc.

A communicative coupling between a user's SCM/ATC and another individual's device is also disclosed. For example, a parent or caregiver may configure a ward's SCM such that it sends a signal when used during driving. The parent or caregiver may then manually send a reply to the ATC, causing it to take an action limiting the distraction level of the HMD on the driver. Note that in this example, this action is applied to the HMD, not the car. For example, a parent may disable the playing of videos on the HMD when a teenager is driving.

For certain scenarios, the SCM and/or ATC may be tailored to the specific properties of a model of vehicle. For example, display features of the vehicle may be presented to a driver via his or her HMD, and therefore this display will be under the control of the vehicle. For user specified functions and applications displayed on an HMD, the level of safety and distraction produced, and thus the appropriate action on the HMD that is required may also be functions of the vehicle, and therefore may be optimally set by the vehicle manufacturer via the design of a vehicle's SCM and/or ATC. In this case, the SCM and ATC would be part of the vehicle, and capable of accessing a driver's HMD via standard interfaces to provide these safety functions.

In one example of operation, the SCM checks one or more real-time attributes of vehicle (v), driver (d), and the information presentation on the HMD (h). The system computes a distraction level D based on D=f(h, v, d). Then the ATC takes a safety action based on D.

Note that although this description includes simultaneous use of HMDs and vehicle driving, it may have use in other scenarios such as when walking down a street filled with people, when operating heavy machinery, when operating a boat or plane, or when privacy is needed in offices or meeting places.

In another example, an situational perimeter awareness component/module enables situational perimeter awareness (SPA) by scanning the environment in the vicinity of the vehicle. The SPA component functions are triggered by analysis of situational conditions/attributes as defined in by the SCM. The SCM component is constantly analyzing real-time attributes and conditions coming from the HMD, vehicle, and driver. When the SCM component determines that one or more SPA-defined conditions or attributes exist, the SPA may scan the defined perimeter. The SPA component uses sensors on the HMD and/or car to scan a defined perimeter for situational queues or objects. Situational queues or objects in the scan perimeter may include other vehicles, pedestrians, pets, potholes, traffic lights, traffic signs, vehicle speed, rate of acceleration/deceleration, or weather conditions. For example, the scanning component may scan perimeter ranges that could be set between 45 and 360 degrees and up to 50 yards. Based on these features, the SPA then analyzes the perimeter scan-data to identify any situational queues or objects. Finally, the SPA interfaces in real-time with the SCM module to execute any corresponding ATC safety actions. In general, the purpose of the SPA is to facilitate safety actions that could greatly increase or improve driver awareness and/or vehicle perimeter awareness, risk assessment, and safety-action response time.

The features and methods described in this disclosure involve a unique set of method components that can collect, analyze, advise, and execute both human driver and vehicle safety practices in real time. For example, for the driver, the HMD component device delivers visual and/or audio prompts that alert, inform, and instruct drivers real time on situational safety and optional actions within a defined perimeter. For the integrated vehicle, the ATC component may optionally have an interface with vehicle control systems to execute safety actions as determined by SCM analysis of key environment and situational data collected by HMD and SPA module. Optionally, these vehicle controls may be restricted to a small set of changes such as the reduction in radio volume or the engaging of traction control, and this set of controls may be approved by a vehicle operator before they are included as options to a system.

The terminology used herein is for the purpose of describing particular embodiments only and is not intended to be limiting of the description. As used herein, the singular forms "a", "an" and "the" are intended to include the plural forms as well, unless the context clearly indicates otherwise.

The terms "comprises" and/or "comprising," specify the presence of stated features, steps, operations, elements, and/or components, but do not preclude the presence or addition of one or more other features, integers, steps, operations, elements, components, and/or groups thereof.

The term "application server" includes a device or system for distributing and synchronization updates to software applications with remotely located devices operating the software. A remotely located device includes a remote head mounted display systems coupled to the application server over a wired or wireless network such as the Internet, WiFi, or cellular networks.

The term "remote head mounted display system" includes a computer system having a display that is worn on the head of a user and is remotely located from the application server. The computer system may be incorporated into the device worn on the head incorporating the display or may be wired or wirelessly separated from the device worn on the head of the user. The remote head mounted display system may have a headset output having one or two displays for presenting visual information to one or both eyes of the user, the headset output may also have one or two speaker systems for presenting audio information to one or both ears of the user. In other examples, the remote head mounted display system may have the display included in a structure that is not necessarily worn by the user such as a cellphone, tablet, laptop or PC and further may be locally rather than remotely coupled to the application server.

The term "arrangement" means a system including an application server and a remote head mounted display system.

The term "application" means a software module, process, or program downloaded from the application server to the remote head mounted display system for operation on the remote head mounted display system. An application of this description has a plurality of operating modes that vary an amount of information presented to a user of a remote head mounted display system. The plurality of operating modes have associated tolerance levels indicative of a cognitive load or the amount of distraction presented by the application to the user while operating in that mode. The term application further includes an application suite comprising a set of applications serving a similar purpose but with different operating modes and different tolerance levels.

The term "activity" indicates a user involvement that is not necessarily related to the comprehension of the output of the application. In example of an activity is the occupying a vehicle as either a driver or a passenger.

The term "vehicle" includes an automobile, motorcycle, truck, tractor, aircraft, watercraft, bicycle, skate board or other transportation device. The vehicle may have a telematics system that is able to determine an error in operation of the vehicle, such as a lane departure or excessive braking, and generate an errant vehicle operation signal to the application server either directly or through the remote head mounted display system. The vehicle may also have a vehicle output for delivering audio and/or video information, including application information to the user.

The term "operating context" of a remote head mounted display system means the environment in which the remote head mounted display system is presenting information generated by the application to the user. While in a vehicle, the operating context includes a milieu signal which includes a role of the user, such as driver or passenger of a vehicle as well as user age, user alertness, user driving history, and length of time occupying vehicle. The operating context further includes a driving condition signal including an atmospheric condition, a road condition, or a traffic condition associated with the vehicle.

The term "distraction signal" indicates a signal indicative of a level of distraction of the user wearing the remote head mounted display system at the operating mode of the application.

FIG. 1 illustrates an example block diagram of system for managing applications having a variable operating mode for use with a remote head mounted system. An application server 100 comprises a distraction analyzer 102 adapted to receive a distraction signal based upon a user 110 engaged in an activity such as driving a vehicle 112 while wearing a remote head mounted display system 115. The remote head mounted display system is presenting an output of an application 120 having a plurality of operating modes 122 for modifying an amount of information presented to the user wearing the remote head mounted display system. Each of the plurality of operating modes has a corresponding tolerance level 124 for enabling the remote head mounted display system 115 to select one of the plurality of operating modes. The distraction signal includes a level of distraction of the user wearing the remote head mounted display system during the activity and the operating mode of the application. The distraction analyzer 102 further operates to adjust the tolerance level 124 of at least one of the plurality of operating modes 122 based upon the distraction signal. The application server 100 also includes a synchronizer 126 that operates a process to communicate the adjusted tolerance level to at least a second remote head mounted display system 128.

The distraction server may receive a multiplicity of distraction signals based upon a crowd of a multiplicity of users engaged in the activity while wearing a corresponding multiplicity of remote head mounted display systems 115, 128, 130, operating the application and adjust the tolerance level 124 of at least one of the plurality of operating modes 122 based upon the multiplicity of distraction signals. The synchronizer 126 further communicates the adjusted tolerance level to the multiplicity of remote head mounted display systems 115, 128, 130.

The remote head mounted display system 115 comprises an application memory 140 for storing the application 120 downloaded from the application server 100. Applications are then operated on an application host 141 which may include a microcomputer or other processor and an output which may be presented on a display. The remote head mounted display system also includes a safety checking module 142 generating a safety check signal based upon an operating context of the remote head mounted display system 115 and a mode selector 144 selecting the application operating mode based upon the safety check signal and the tolerance level of the application operating mode. A distraction detector 145 generates the distraction signal based upon a determined error in an operation of the vehicle 112 within which the user 110 is occupying and communicating the distraction signal to the application server 100. Synchronizer 146 modifies the tolerance level of the application 120 stored in the application memory 140 based upon an adjusted tolerance signal received from synchronizer 126 of the application server 100.

In another example, safety signal can be communicated from the safety checking module 142 to the application server 100 and the mode selector process 144 included within the application server rather than the remote head mounted display system. A mode selection signal would then be communicated from the application server to the application host 141 of the remote head mounted display system to operate the application mode based upon the adjusted tolerance level at the mode selected by the application server. In this example it not necessary to synchronize the application tolerance levels at both the application server and the remote head mounted display systems. Whether the mode selection process occurs in the application server, or the remote head mounted display system, the disclosure shows the remote head mounted display system operates the application based upon the adjusted tolerance level. In a similar example, the regulation detector process 152 may be moved from the remote head mounted display system to the application server.

The remote head mounted display system 115 further comprises a telematics interface 148 for wirelessly interfacing with a telematics system 150 of the vehicle 112 for receiving an errant vehicle operation signal based upon a vehicle determined error in an operation of the vehicle. An errant vehicle operation includes at least one of a lane departure, an excessive braking, and an excessive acceleration determination. In another example, the errant vehicle operation signal may be sent directly from the vehicle telematics system 150 to the application server 100 without going through the remote head mounted display system 115 using a cellular, WiFi or other coupling. In another example, the errant vehicle operation signal may be generated by the remote head mounted display system 115. For example, excessive braking may be determined using a signal from an accelerometer included in the remote head mounted display system, and lane departures may be optically determined using a camera system included in the head mounted display system. Many other errant vehicle operations are possible, and considered to be within the scope of this description: such operations include collisions, near collisions, excessive acceleration, improper turns, driving the wrong way on a one way street, running a stop sign or a stop light, exceeding speed limits, and failure to comply with other traffic rules. In other examples the distraction signal may be received from any of a number of sources, for example from a survey about an operating mode of the application completed by the user. The survey may be offered in an on-line web page format soliciting responses from the user for determining a level of distraction.

Safety checking module 142 further includes a regulation detector 152 for further generating the safety check signal based upon a regulations signal based upon changes in regulations governing a use of head mounted display systems by users operating vehicles and communicated by a regulations compliance process 154 in the application server 100. The regulations may be based upon local, state or federal government rules as well as familial rules, established by parents of a child, employer rules established by employers of drivers of company vehicles of for those driving on company business, or other rules established for other purposes. For example, if Nevada statutes required head mounted displays systems worn while driving to present a reduced cognitive load to a driver relative to a passenger, and California statutes required an outright ban of operating head mounted display systems operating applications while occupying a moving vehicle, then upon determining the location of the head mounted display system (using a global positioning system for example) the corresponding operation would be invoked. In this example, the head mounted display system would operate an application in mode having a reduced amount of information presented to the user (a reduced cognitive load) while driving a vehicle in Nevada, and would disable the application while the user is occupying a moving vehicle in California.

The safety checking module 142 generates the safety check signal based upon the milieu detector 154 which determines the role of the user, which in this example may determine if the user is a driver or a passenger in the vehicle 112 and/or a condition of the user including at least one of user age, user alertness, user driving history, and length of time occupying vehicle. Safety checking module 142 also includes a driving condition detector 156 which detects driving conditions of the vehicle, such as a weather condition (rain, snow, ice, dark, etc.), a road condition (free way, suburban, country, city, paved, dirt) and a traffic condition (rush hour, congested, lightly traveled).

The safety check modules uses the parameters to generate a safety signal indicative of the operating context of the remote head mounted display system and thus the availability of the user to be exposed to an output of an application operating on the remote head mounted display system. The application has a plurality of operating modes that modify the amount of information presented to the user (and thus vary cognitive load presented by the application) as represented by the plurality of tolerance levels 124 associated with the plurality of operating modes 122. The mode selector 144 matches the user's available cognitive load with the cognitive load presented by the application mode. Tolerance levels 124 may derive from context of the remote head mounted display system that may include a model of the dynamics of a user's cognitive states, from which an estimate of available cognitive load may be derived.

For example, application 120 is a weather application and mode A has a high tolerance level of 8 and provides a larger amount of information such as presenting an output at the remote head mounted display system of a weather map with an avatar providing an audio description of the weather. Mode B has a medium tolerance level of 5 and presents audio and static visual icons regarding the current temperature and barometric conditions. Mode C has a low tolerance level of 2 and only presents audio information regarding the current temperature on the vehicle audio system. If the safety check module generates a safety signal generates a value of 6 based on the context of the remote head mounted display system, then operating mode B would be selected because the tolerance level of 5 (mode B) is less than 6, the value of the safety signal.

If the safety signal was calculated based on sunny dry driving conditions, and if the conditions changed to dark and wet roads, then the value of the safety signal may be reduced from 6 to 4, and in response mode C selected because mode B's tolerance level of 6 exceeds the value of the safety signal, while mode C has a tolerance level of 2 which does not exceed the value of the safety signal. Thus, under sunny and dry driving conditions the driver of the vehicle would experience a weather application that presents audio and static visual icons regarding the current the temperature and barometric pressure conditions on the remote head mounted display system, while under dark and wet driving conditions the driver would experience audio information regarding the current temperature on the vehicle audio system.

Meanwhile, a rear seat passenger of the vehicle may experience the application in mode A, an output at the remote head mounted display of a weather map with an avatar providing an audio description of the weather, because a for rear seat passenger, the safety check signal may produce a value of 9 based upon the current context of the passenger's remote head mounted display system having a low cognitive load, and therefore allowing a greater additional load to experience the application. However, a front seat passenger of the vehicle may experience the application in mode A under sunny dry conditions and mode B under dark wet conditions in order to have additional cognitive load available to assist the driver under difficult driving conditions.

The tolerance level of the modes of an application may be set by the application developer or other entity estimating the cognitive load of the mode of the application. However, this description goes further to manage the tolerance level based upon inputs from various sources including the user of the application while performing various activities. The inputs may be received from multiple users, or a crowd. The tolerance level adjustment is done by monitoring erroneous behavior of the user in the activity while the application is being operated. For example, a threshold level of lane departures per hour of driving may be acceptable for the previously mentioned weather application. The threshold may be 0.1% for example. The remote head mounted display system, the vehicle telematics system, or both may report lane departures to the application server. Data from multiple, even thousands of remote head mounted display systems may be gathered by the application server, and if the threshold is exceeded, then tolerance level may be decreased. For example, if the application server determines that in mode B the application generated 0.2% lane departures when 0.1% is the threshold for the application, then the tolerance level of mode B may be increased from 5 to 7. In the prior example, where the safety checking signal had a value of 6, the application would now operate in mode C rather than mode B because of the excessive level of lane departures received from the application server monitoring the crowd of users operating the application in mode B while driving. In other examples, many more than three modes of an application may be developed with a wider range of tolerance levels to allow the application operating mode to adapt in response to signals received from the crowd.

Also note that in one example, a first remote head mounted display system operated by a first user of a first vehicle may generate a lane departure signal which causes the application server to modify the tolerance level of the application and communicate the modified tolerance level to another remote head mounted display system. Thus, the tolerance level of the mode of the application in the other remote head mounted display system is modified even though the user of the other remote head mounted display system had not generated an erroneous operation signal. Thus, the description provides the potential advantage of preemptively enhancing safety of the application of the other head mounted display system even though the other user had not yet encountered an erroneous operation. Furthermore, such preemptive modification may be further based on a match between category of users' profiles, including such information as number of years driving, driving history, and insurance level.

Figure 2:
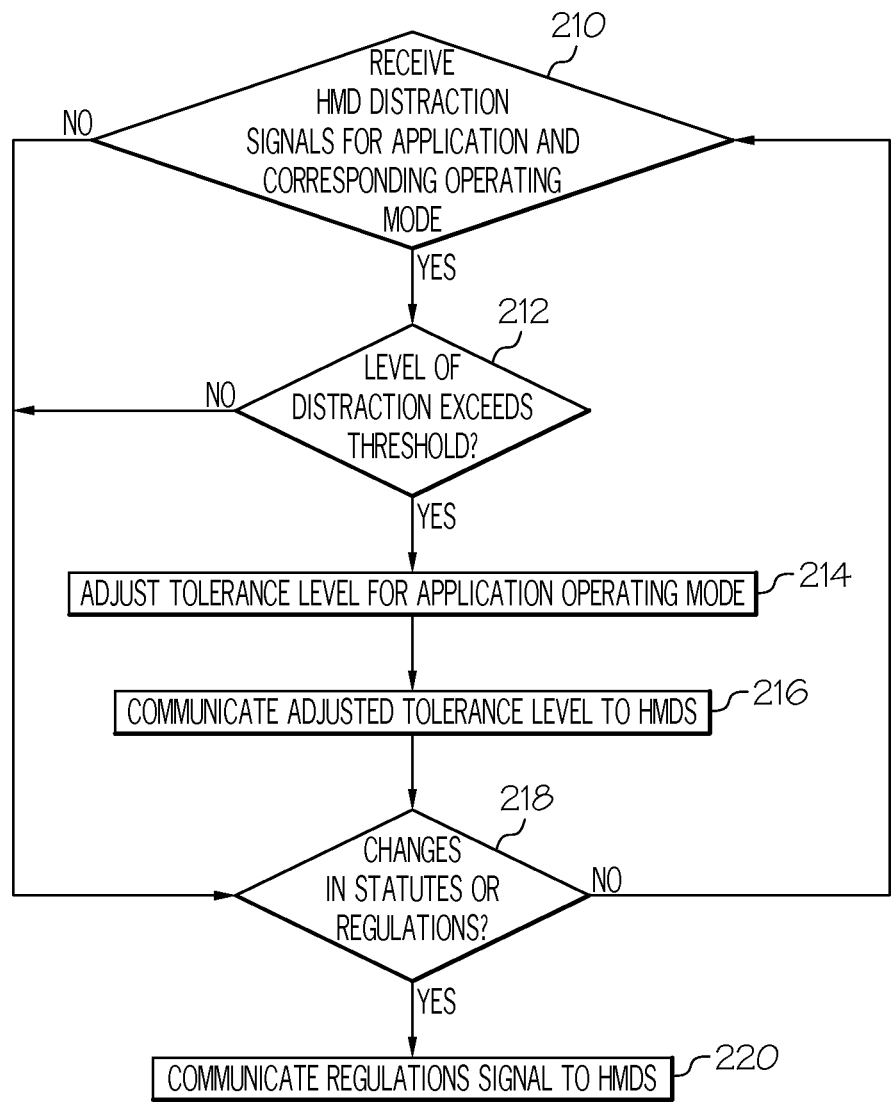
FIG. 2 shows an example flow diagram of a process enabling variable operating mode application management for a remote head mounted display system based upon crowd determined distractions in an application server.

FIG. 2 shows an example flow diagram of a process enabling variable operating mode application management for a remote head mounted display system based upon crowd determined distractions in an application server. Step 210 determines if a distraction signal has been received from a remote head mounted display system for an application and its corresponding operating mode. If so, step 212 determines if the level of distraction has been exceeded and if so, the tolerance level is adjusted in response at step 214. The adjusted tolerance level is communicated at step 216 resulting in the synchronization of the tolerance level of a mode of operation of the application between the application server and at least one remote head mounted display system. Step 218 determines if a change has been made to a statute or regulation governing the operation of the remote head mounted display system, and if so a regulations signal is communicated to the remote head mounted display system.

The process of FIG. 2 may be performed for applications operating on a single remote head mounted display system, a plurality of remote head mounted display systems, or thousands or millions of remote head mounted display systems while remaining within the scope of this description. The application server also conducts many other processes related to the distribution of applications. Such other processes are known to those familiar with the art.

Figure 3:
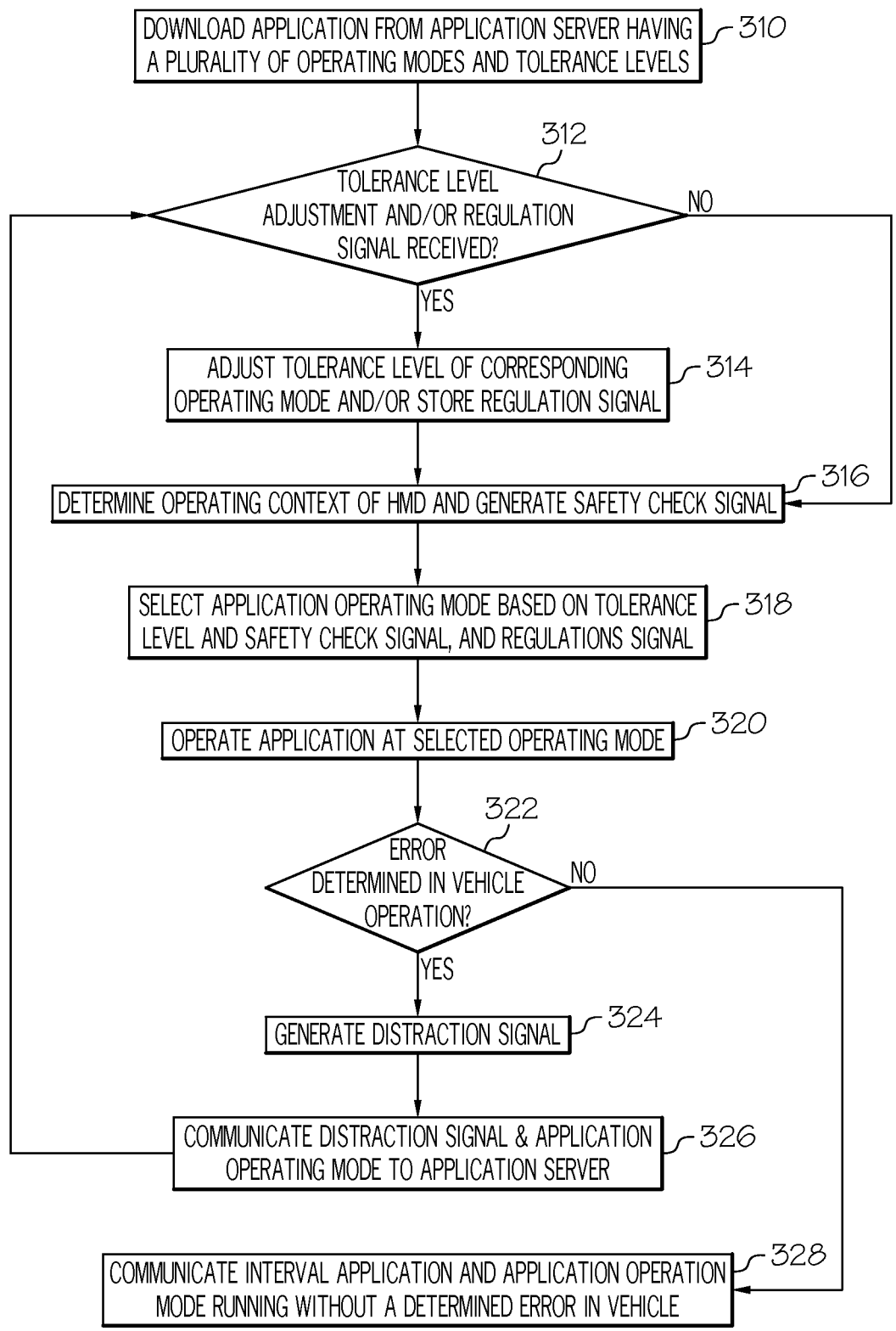
FIG. 3 shows an example flow diagram of a process enabling variable operating mode application management in a remote head mounted display system based upon crowd determined distractions.

FIG. 3 shows an example flow diagram of a process enabling variable operating mode application management in a remote head mounted display system based upon crowd determined distractions. The process may be implemented upon non-transitory computer program product comprising a storage medium readable by a processing circuit and storing instructions for execution by the processing circuit. In the process, the remote head mounted display system downloads the application from the application server at step 310. Step 312 determines if a tolerance level adjustment and/or regulation signal is received from the application server. If so, the tolerance level and/or regulation signal associated with the application is adjusted, and is thereby synchronized with the application server at step 314. Thereafter, the operating context of the remote head mounted display system is determined and the safety check signal is generated at step 318 and step 320 operates the application at the selected operating mode. Step 322 then determines if an error has occurred in the vehicle operation while the application is operating, and if so, step 324 generates the distraction signal which is communicated to the application server along with the application operating mode at step 326. Optional step 328 then reports intervals where the application is operating without a detected error in vehicle operation. In other examples, the distraction signals and error free operation intervals may be stored in a batch and communicated to application server at convenient times, such as delaying until a WiFi link is available instead of using cellular bandwidth, or on a periodic basis, such as hourly, daily, weekly or monthly.

FIG. 2 and FIG. 3 show that an application server has a process for receiving a distraction signal based upon a user engaged in an activity while wearing a remote head mounted display system. The remote head mounted display system presents an output of an application having a plurality of operating modes. Each of the plurality of operating modes modifies an amount of information presented to the user wearing the remote head mounted display system. Each of the plurality of operating modes has a corresponding tolerance level for enabling the remote head mounted display system to select one of the plurality of operating modes. The received distraction signal includes a level of distraction of the user wearing the remote head mounted display system during the activity and the operating mode of the application. The application server adjusts the tolerance level of at least one of the plurality of operating modes based upon the distraction signal and communicates the adjusted tolerance level to a second remote head mounted display system. The activity includes operating a vehicle and the level of distraction includes an errant vehicle operation signal received from the vehicle and generated by a telematics system included within the vehicle. The level of distraction includes an errant vehicle operation signal and is based upon at least one of a detection of a lane departure of the vehicle and an excessive braking of the vehicle. In another example, the level of distraction includes an errant vehicle operation signal based upon a determined error in an operation of the vehicle, as well as a milieu signal including a role of the user engaged in the activity, the role including at least one of a driver and a passenger of the vehicle and/or a driving condition signal based upon at least one of an atmospheric condition, a road condition, and a traffic condition associated with the vehicle occupied by the user.

FIG. 2 and FIG. 3 also show a remote head mounted display system for downloading the application from the application server, generating a safety check signal based upon an operating context of the remote head mounted display system, selecting one of the plurality of operating modes of the application based upon the corresponding tolerance level and the safety check signal, and operating the application at the selected operating mode.

In one example, selecting an operating mode may select another alternative application. For example, if a remote head mounted display application had two weather applications one being a complex output application requiring a significant cognitive load and without a mode like mode C of the aforementioned weather having a minimum tolerance of 2, and the safety checking signal indicated that the minimum tolerance of an application should be two or less, then instead of loading the more complex weather application and not executing it because it does not have an operating mode with a tolerance level of 2 or less, the weather application of the aforementioned example would be loaded and operated (because they are both weather applications) and the operating mode selected would be C.

In another example, the activity includes occupying a vehicle and the remote head mounted display system includes a headset output for interfacing with the user, and the vehicle includes a vehicle output for interfacing with the user, wherein the selecting the application operating mode includes directing the output of the application between the headset output and the vehicle output. In this case if the aforementioned weather application was implemented and operating mode B was selected because the safety signal indicated a tolerance level of 5 or less, then the output is sent to speakers only. However, if operating mode A was selected because the safety signal indicated a tolerance level of 8 or less, then the output would be sent to speakers of the vehicle and display of the remote head mounted display system.

The process in the remote head mounted display system also includes determining an errant vehicle operation signal based upon a determined error in an operation of the vehicle, generating the distraction signal based upon the errant vehicle operation signal and the operating mode of the application, and communicating the distraction signal to the application server. The operating context of the remote head mounted display system may be based upon at least one of a milieu signal determined based upon a role of the user, the role including at least one of a driver and a passenger of the vehicle, and a driving condition signal determined based upon at least one of an atmospheric condition, a road condition, and a traffic condition associated with the vehicle. The milieu signal may further be determined based upon a condition of the user, including at least one of user age, user alertness, user driving history, and length of time occupying vehicle, and outputs of a user cognitive model.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The description of the present application has been presented for purposes of illustration and description, but is not intended to be exhaustive or limited to the description in the form disclosed. Many modifications and variations will be apparent to those of ordinary skill in the art without departing from the scope of the description. The example was chosen and described in order to best explain the principles of the description and the practical application, and to enable others of ordinary skill in the art to understand the description for various examples with various modifications as are suited to the particular use contemplated.

What is claimed is:

1. A method comprising:
    at an application server,
    receiving a distraction signal based upon a user engaged in an activity while wearing a remote head mounted display system presenting an output of an application having a plurality of operating modes for modifying information presented to the user wearing the remote head mounted display system, each of the plurality of operating modes having a corresponding tolerance level for enabling the remote head mounted display system to select one of the plurality of operating modes, the distraction signal including
        a level of distraction of the user wearing the remote head mounted display system during the activity and
        the operating mode of the application;
    adjusting the tolerance level of at least one of the plurality of operating modes based upon the distraction signal; and
    enabling a second remote head mounted display system to operate the application based upon the adjusted tolerance level.

2. The method according to claim 1 wherein
the receiving receives a multiplicity of distraction signals based upon a multiplicity of users engaged in the activity while wearing a corresponding multiplicity of remote head mounted display systems operating the application,
the adjusting adjusts the tolerance level of at least one of the plurality of operating modes based upon the multiplicity of distraction signals, and
the enabling further enables the multiplicity of remote head mounted displays system to operate the application based upon the adjusted tolerance level.

3. The method according to claim 1 wherein the activity includes operating a vehicle and the level of distraction includes an errant vehicle operation signal received from the vehicle and generated by a telematics system included within the vehicle.

4. The method according to claim 1 wherein the activity includes operating a vehicle and the level of distraction includes an errant vehicle operation signal is based upon at least one of a detection of a lane departure of the vehicle and an excessive braking of the vehicle.

5. The method according to claim 1 wherein the activity includes occupying a vehicle and the level of distraction includes
an errant vehicle operation signal based upon a determined error in an operation of the vehicle, and
a milieu signal including a role of the user engaged in the activity, the role including at least one of a driver and a passenger of the vehicle.

6. The method according to claim 1 wherein the activity includes occupying a vehicle and the level of distraction includes
an errant vehicle operation signal based upon a determined error in an operation of the vehicle, and
a driving condition signal based upon at least one of an atmospheric condition, a road condition, and a traffic condition associated with the vehicle occupied by the user.

7. The method according to claim 1 further comprising:
at the remote head mounted display system
downloading the application from the application server;
generating a safety check signal based upon an operating context of the remote head mounted display system;
selecting one of the plurality of operating modes of the application based upon the corresponding tolerance level and the safety check signal; and
operating the application at the selected operating mode.

8. The method according to claim 7 wherein the selecting includes selecting an alternative application.

9. The method according to claim 7 wherein the activity includes occupying a vehicle and the remote head mounted display system includes a headset output for interfacing with the user, and the vehicle includes a vehicle output for interfacing with the user, wherein the selecting the application operating mode includes directing the output of the application between the headset output and the vehicle output.

10. The method according to claim 7 wherein the activity includes occupying a vehicle and the method further comprises the steps of:
determining an errant vehicle operation signal based upon a determined error in an operation of the vehicle;
generating the distraction signal based upon the errant vehicle operation signal and the operating mode of the application; and
communicating the distraction signal to the application server.

11. The method according to claim 7 wherein the activity includes occupying a vehicle and the operating context of the remote head mounted display system is based upon at least one of
a milieu signal determined based upon a role of the user, the role including at least one of a driver and a passenger of the vehicle, and
a driving condition signal determined based upon at least one of an atmospheric condition, a road condition, and a traffic condition associated with the vehicle.

12. The method according to claim 11 wherein the milieu signal is further determined based upon a condition of the user, the condition of the user including at least one of user age, user alertness, user driving history, and length of time occupying vehicle.

13. The method according to claim 7 further comprising:
at the application server,
generating a regulations signal based upon changes in regulations for a use of head mounted displays by users within an operating context; and
communicating the regulations signal to the remote head mounted display system, and
at the head mounted display, receiving the regulations signal and the selecting further selects the one of the plurality of operating modes of the application based upon the regulations signal.

14. An application server comprising:
a distraction analyzer operating a process adapted to
receive a distraction signal based upon a user engaged in an activity while wearing a remote head mounted display system presenting an output of an application having a plurality of operating modes for modifying information presented to the user wearing the remote head mounted display system, each of the plurality of operating modes having a corresponding tolerance level for enabling the remote head mounted display system to select one of the plurality of operating modes, the distraction signal including a level of distraction of the user wearing the remote head mounted display system during the activity and the operating mode of the application, and
adjust the tolerance level of at least one of the plurality of operating modes based upon the distraction signal; and
a synchronizer operating a process adapted to communicate the adjusted tolerance level to a second remote head mounted display system.

15. The application server according to claim 14 wherein the distraction analyzer further receives a multiplicity of distraction signals based upon a multiplicity of users engaged in the activity while wearing a corresponding multiplicity of remote head mounted display systems operating the application, and adjusts the tolerance level of at least one of the plurality of operating modes based upon the multiplicity of distraction signals, and
the synchronizer further communicates the adjusted tolerance level to the multiplicity of remote head mounted display systems.

16. An application server according to claim 14 further comprised with an arrangement including the remote head mounted display system, the remote head mounted display system comprising:
an application memory storing the application;
a safety checking module generating a safety check signal based upon an operating context of the remote head mounted display system;

a mode selector selecting the application operating mode based upon the safety check signal and the tolerance level of the application operating mode;

a distraction detector generating the distraction signal based upon a determined error in an operation of a vehicle within which the user is occupying and communicating the distraction signal to the application server; and a synchronizer modifying the tolerance level based upon an adjusted tolerance signal received from the application server.

17. The application server according to claim 16 wherein the remote head mounted display system further comprises a telematics interface for wirelessly interfacing with a telematics system of the vehicle for receiving an errant vehicle operation signal based upon a vehicle determined error in an operation of the vehicle.

18. The application server according to claim 16 wherein the safety checking module further includes a regulation detector for further generating the safety check signal based upon a regulations signal based upon changes in regulations governing a use of head mounted display systems by users operating vehicles and communicated by the application server to the remote head mounted display system.

19. A non-transitory computer program product comprising:

a storage medium readable by a processing circuit and storing instructions for execution by the processing circuit of an application server for performing a method comprising:

receiving a distraction signal based upon a user engaged in an activity while wearing a remote head mounted display system presenting an output of an application having a plurality of operating modes for modifying an amount of information presented to the user wearing the remote head mounted display system, each of the plurality of operating modes having corresponding tolerance level for enabling the remote head mounted display system to select one of the plurality of operating modes, the distraction signal including a level of distraction of the user wearing the remote head mounted display system during the activity and the operating mode of the application;

adjusting the tolerance level of at least one of the plurality of operating modes based upon the distraction signal; and enabling a second remote head mounted display system to operate the application based upon the adjusted tolerance level.

20. The non-transitory computer program product according to claim 19 wherein the storage medium is readable by a second processing circuit and storing instructions for execution by the processing circuit of a the remote head mounted display system for performing a method comprising:

downloading the application from the application server;

generating a safety check signal based upon an operating context of the remote head mounted display system;

selecting one of the plurality of operating modes of the application based upon the corresponding tolerance level and the safety check signal; and operating the application at the selected operating mode.

* * * * *